US009097122B2

(12) United States Patent
Borja

(10) Patent No.: US 9,097,122 B2
(45) Date of Patent: Aug. 4, 2015

(54) TURBINE ENGINE MONITORING SYSTEM

(75) Inventor: Mark Borja, Palm Beach Gardens, FL (US)

(73) Assignee: United Technologies Corporation, Hartford, CT (US)

( * ) Notice: Subject to any disclaimer, the term of this patent is extended or adjusted under 35 U.S.C. 154(b) by 785 days.

(21) Appl. No.: 13/361,573

(22) Filed: Jan. 30, 2012

(65) Prior Publication Data

US 2013/0192259 A1 Aug. 1, 2013

(51) Int. Cl.
*F02C 7/00* (2006.01)
*F01D 5/02* (2006.01)
*F01D 21/00* (2006.01)

(52) U.S. Cl.
CPC .............. *F01D 5/027* (2013.01); *F01D 21/003* (2013.01); *F05D 2240/61* (2013.01); *F05D 2260/80* (2013.01)

(58) Field of Classification Search
CPC ... F01D 21/003; F01D 17/02; F05D 2240/61; F05D 2260/80
USPC ................................................ 60/803, 39.281
See application file for complete search history.

(56) References Cited

U.S. PATENT DOCUMENTS 3,142,991 A * 8/1964 Pittman ...................... 73/504.07
3,186,218 A 6/1965 Hollis
3,686,514 A 8/1972 Dube et al.
4,075,562 A * 2/1978 Karstensen et al. .......... 324/173
4,300,078 A 11/1981 Pascal
4,671,117 A 6/1987 Movick
5,390,402 A 2/1995 White et al.
6,568,091 B1 5/2003 Mercer et al.
7,095,243 B1 8/2006 Davis
7,322,195 B2 1/2008 Borja et al.
7,735,310 B2 * 6/2010 Metscher ................... 60/39.091
7,743,600 B2 6/2010 Babu et al.
7,854,582 B2 12/2010 Ullyott
2006/0032319 A1 * 2/2006 Zielinski .................. 73/862.045
2008/0072567 A1 * 3/2008 Moniz et al. ................. 60/226.1
2008/0224845 A1 9/2008 Bires
2010/0074572 A1 * 3/2010 Zheng et al. ..................... 385/13
2010/0221103 A1 * 9/2010 Malston ........................ 415/177
2011/0133950 A1 * 6/2011 Subramanian et al. .. 340/870.28
2012/0096961 A1 * 4/2012 Schleif et al. ................ 73/866.5

* cited by examiner

*Primary Examiner* — Ted Kim
(74) *Attorney, Agent, or Firm* — O'Shea Getz P.C.

(57) ABSTRACT

A turbine engine system includes a turbine engine shaft, a first rotor, a second rotor and an engine monitoring system. The shaft includes a shaft bore formed by a shaft wall. The shaft bore extends along an axial centerline through the shaft between a first shaft end and a second shaft end. The first rotor is connected to the shaft at the first shaft end, and the second rotor is connected to the shaft at the second shaft end. The engine monitoring system includes a sensor connected to the second rotor, a transmitter arranged at the first shaft end, and a plurality of conduit assemblies. Each conduit assembly includes a conduit that extends axially within the shaft bore and is connected to the shaft wall. A first of the conduit assemblies also includes a wire that extends through a respective conduit and connects the sensor and the transmitter.

18 Claims, 4 Drawing Sheets

TURBINE ENGINE MONITORING SYSTEM

This invention was made with government support under Contract No. W911W6-08-2-0001 awarded by the United States Army. The government may have certain rights in the invention.

BACKGROUND OF THE INVENTION

1. Technical Field

The present invention relates generally to a turbine engine and, in particular, to a turbine engine monitoring system.

2. Background Information

A turbine engine may be configured with an engine monitoring system during engine testing and validation processes. A typical engine monitoring system includes one or more sensors and a telemetric transmitter. The sensors may be arranged at various locations within the turbine engine, and the transmitter is typically arranged at the turbine engine intake. The sensors may be connected to the transmitter through respective wires that are freely run through the bore of the turbine engine shaft. In such a configuration, the freely moving wires may cause imbalances (e.g., wobbles) within the turbine engine rotating assembly. Imbalances within the rotating assembly may adversely affect the engine operation being monitored and/or cause damage to the rotating assembly.

Some engine monitoring systems have overcome the aforesaid deficiencies utilizing a bore tube. A typical bore tube extends through the turbine engine shaft and is arranged concentrically with the shaft bore. While the bore tube may constrain the wires along the shaft centerline and reduce imbalances, supports that extend between and spatially separate the interior shaft bore surface and the bore tube are typically complex and expensive, especially for shafts with radially undulating geometries.

SUMMARY OF THE DISCLOSURE

According to an aspect of the invention, a turbine engine system includes a turbine engine shaft, a first rotor, a second rotor and an engine monitoring system. The shaft includes a shaft bore formed by a shaft wall. The shaft bore extends along an axial centerline through the shaft between a first shaft end and a second shaft end. The first rotor is connected to the shaft at the first shaft end, and the second rotor is connected to the shaft at the second shaft end. The engine monitoring system includes a sensor connected to the second rotor, a transmitter arranged at the first shaft end, and a plurality of conduit assemblies. Each of the conduit assemblies includes a conduit that extends axially within the shaft bore and is connected to the shaft wall. A first one of the conduit assemblies also includes a wire that extends through a respective conduit and connects the sensor and the transmitter.

The foregoing features and the operation of the invention will become more apparent in light of the following description and the accompanying drawings.

DETAILED DESCRIPTION OF THE INVENTION

Figure 1:
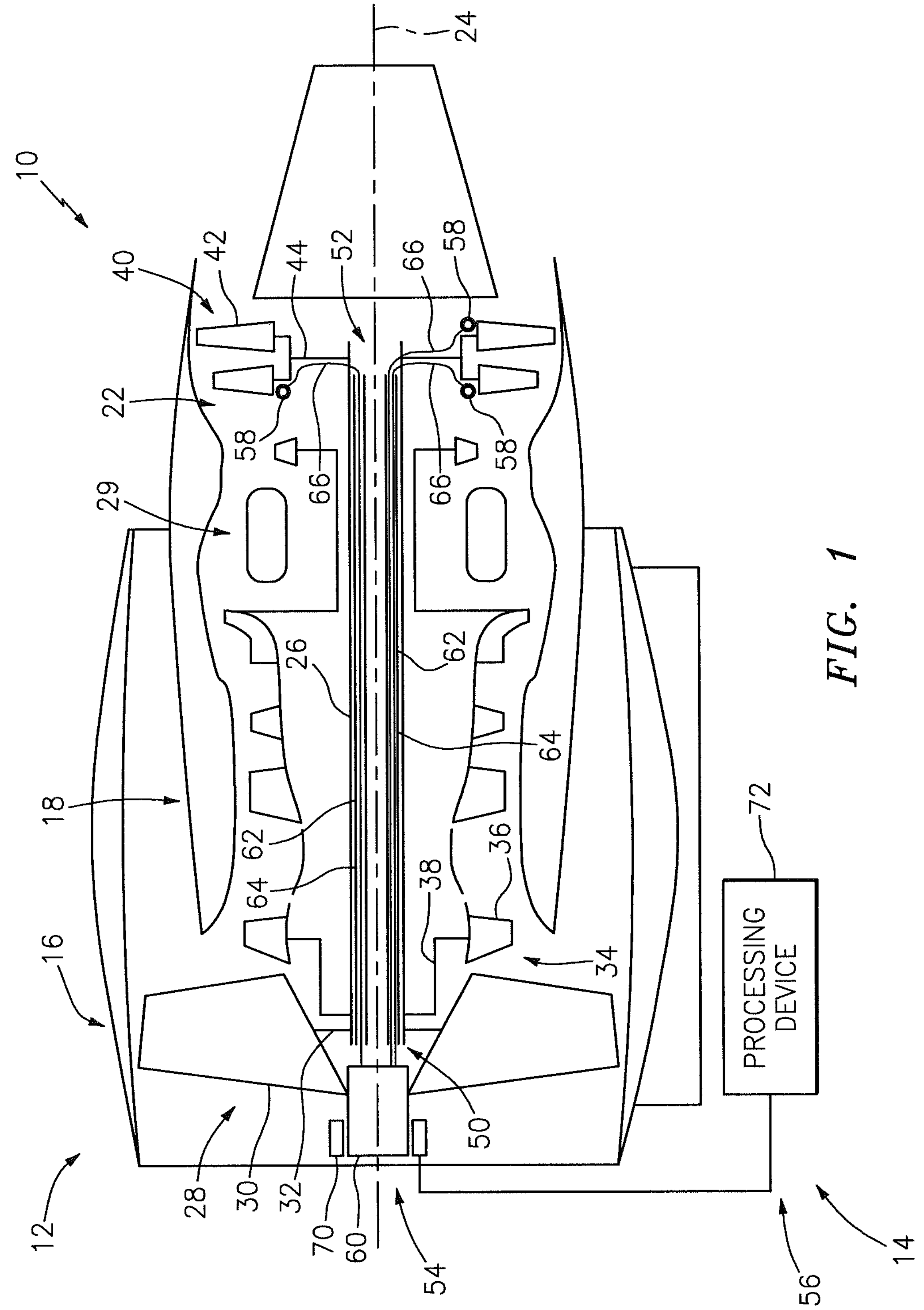
FIG. 1 is a block diagram illustration of a turbine engine system that includes a turbine engine configured with a wireless engine monitoring system.

FIG. 1 is a block diagram illustration of a turbine engine system 10. The turbine engine system 10 includes a turbine engine 12 configured with a wireless (e.g., telemetric) engine monitoring system 14.

The turbine engine 12 may include a fan section 16, a compressor section 18, a combustor section 20 and a turbine section 22 that are sequentially arranged along an axial centerline 24 of a turbine engine shaft 26. The fan section 16 includes a fan rotor 28 having a plurality of fan blades 30 circumferentially arranged around a fan rotor disk 32. The compressor section 18 includes a compressor rotor 34 having a plurality of compressor blades 36 circumferentially arranged around a compressor rotor disk 38. The turbine section 22 includes a turbine rotor 40 having a plurality of turbine blades 42 circumferentially arranged around a turbine rotor disk 44.

Figure 2:
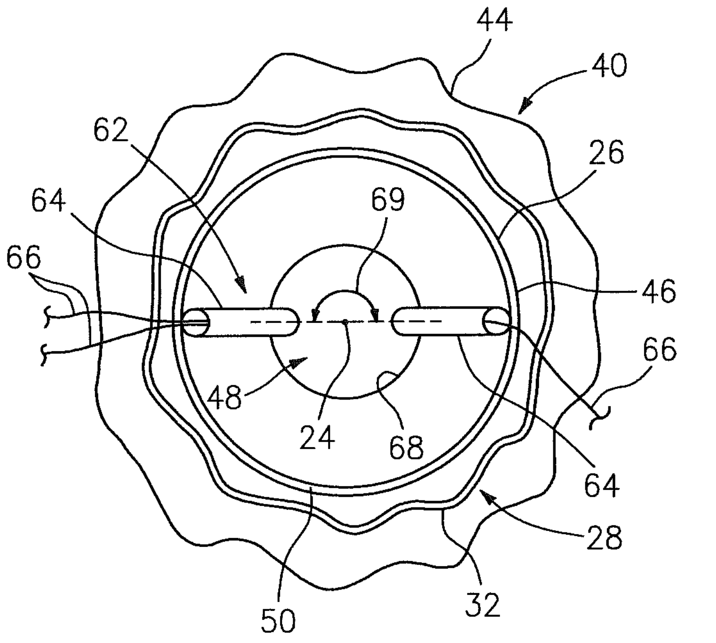
FIG. 2 is a partial front view illustration of a plurality of sensor conduit assemblies arranged in a turbine engine shaft.
Figure 3:
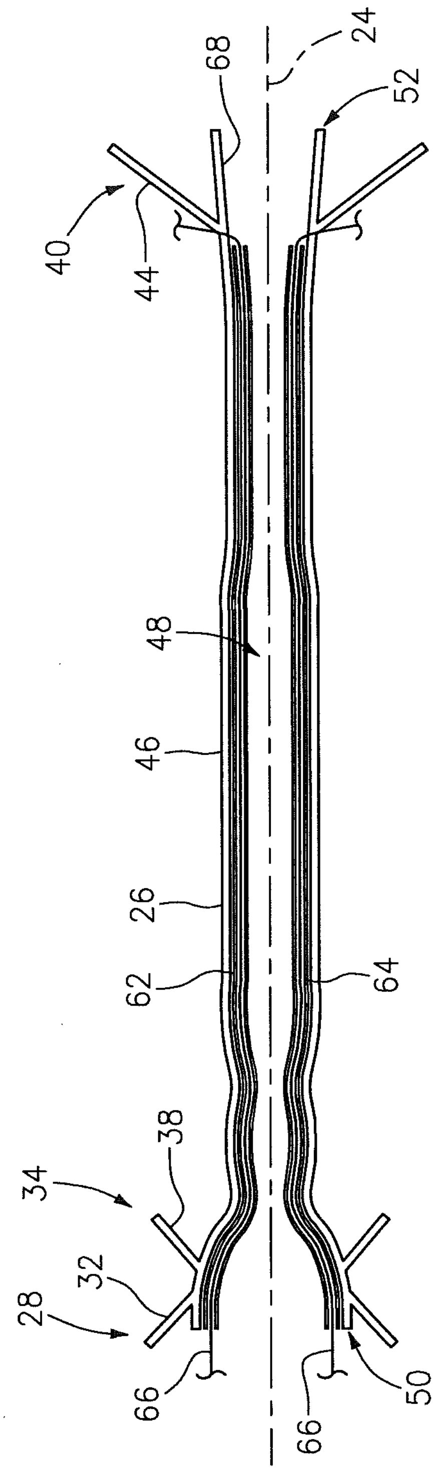
FIG. 3 is side-sectional illustration of the conduit assemblies and the shaft illustrated in FIG. 2.

Referring to FIG. 2, the shaft 26 includes an annular shaft wall 46 that forms an inner shaft bore 48. Referring to FIG. 3, the shaft wall 46 extends axially along the centerline 24 between a first shaft end 50 and a second shaft end 52. The shaft wall 46 may have a shaft wall geometry that radially undulates as the shaft wall 46 extends along the centerline 24. The shaft bore 48 may extend axially through the shaft 26 between the first shaft end 50 and the second shaft end 52.

The fan rotor disk 32 and the compressor rotor disk 38 may each be connected to the shaft 26 at, for example, the first shaft end 50. The turbine rotor disk 44 may be connected to the shaft 26 at, for example, the second shaft end 52.

Referring to FIG. 1, the engine monitoring system 14 may include a data acquisition system 54 and a data processing system 56. The data acquisition system 54 includes one or more engine sensors 58, a wireless (e.g., telemetric) transmitter 60, and a plurality of conduit assemblies 62. Examples of sensors may include pressure sensors, temperature sensors (e.g., thermocouples), stress and/or strain sensors, etc. The sensors 58 may be arranged at the second shaft end 52, and connected to the turbine rotor 40. An example of a transmitter is disclosed in U.S. patent application Ser. No. 11/717,479, which is hereby incorporated by reference in its entirety, and which is assigned to the assignee of the present invention. The transmitter 60 may be connected to the shaft 26 at the first shaft end 50.

Referring to FIGS. 2 and 3, each of the conduit assemblies 62 includes a tubular (e.g., flexible metallic and/or composite) conduit 64. One or more of the conduit assemblies 62 also include one or more (e.g., insulated) electrical wires 66. The conduits 64 extend axially within the shaft bore 48 between, for example, the first shaft end 50 and the turbine rotor 40. The conduits 64 are connected to and in contact with an inner radial surface 68 of the shaft wall 46. The conduits 64 may be circumferentially arranged within the shaft bore 48 such that masses of the conduit assemblies 62 are substantially rotationally balanced about the centerline 24. The conduits 64 may be uniformly located circumferentially about the centerline 24 where, for example, the conduit assemblies 62 have substantially equal masses. Each conduit 64, for example, may be circumferentially spaced from an adjacent conduit 64 by a uniform separation angle 69; e.g., about 180 degrees for two conduit assemblies, about 120 degrees for three conduit assemblies, about 90 degrees for four conduit assemblies, etc. Referring to FIGS. 1 and 3, the wires 66 extend axially through the respective conduits 64, and connect the sensors 58 to the transmitter 60.

Referring to FIG. 1, the data processing system 56 includes a wireless (e.g., telemetric) receiver 70 and a processing device 72 (e.g., a personal computer). An example of a receiver is disclosed in the above referenced U.S. patent application Ser. No. 11/717,479. The receiver 70 may be arranged at the first shaft end 50 adjacent to the transmitter 60. The processing device 72 may be implemented with hardware, software, or a combination thereof. The processing device hardware may include one or more processors, a memory, analog and/or digital circuitry, etc. The processing device 72 is in signal communication (e.g., hardwired or wirelessly connected) with the receiver 70, and may be located remote from the turbine engine 12.

During operation of the turbine engine system 10, one or more of the sensors 58 communicate sensor data to the transmitter 60 through the wires 66. The transmitter 60 wirelessly communicates the sensor data to the receiver 70. The receiver 70 provides the sensor data to the processing device 72.

Figure 5:
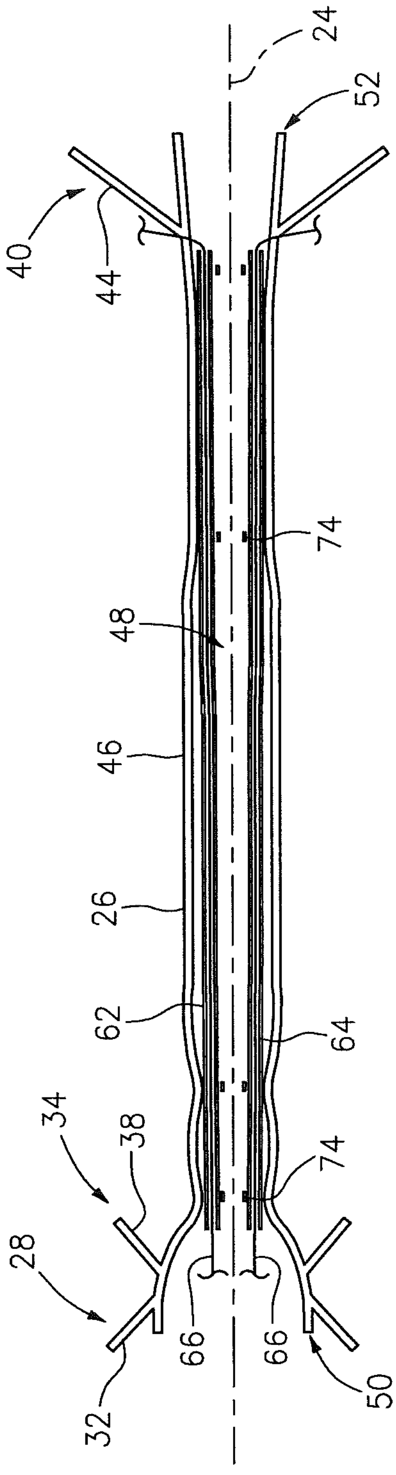
FIG. 5 is side-sectional illustration of the conduit assemblies and the shaft illustrated in FIG. 4.

In some embodiments, for example as illustrated in FIG. 3, one or more of the conduits 64 may have a (e.g., radially undulating) conduit geometry that is shaped to substantially conform to the (e.g., radially undulating) shaft wall geometry. In other embodiments, for example as illustrated in FIG. 5, one or more of the conduits 64 may extend substantially parallel to the centerline 24.

Figure 4:
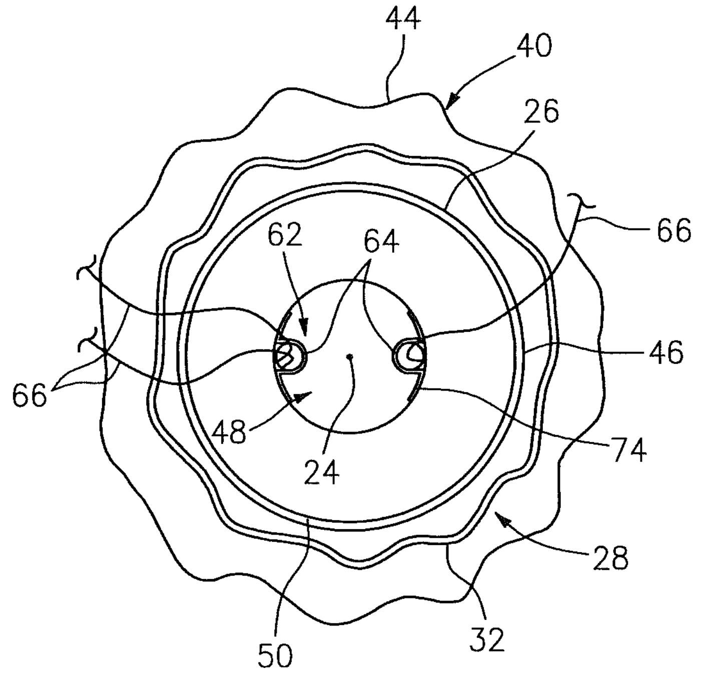
FIG. 4 is a partial front view illustration of a plurality of sensor conduit assemblies arranged in a turbine engine shaft.
Figure 6:
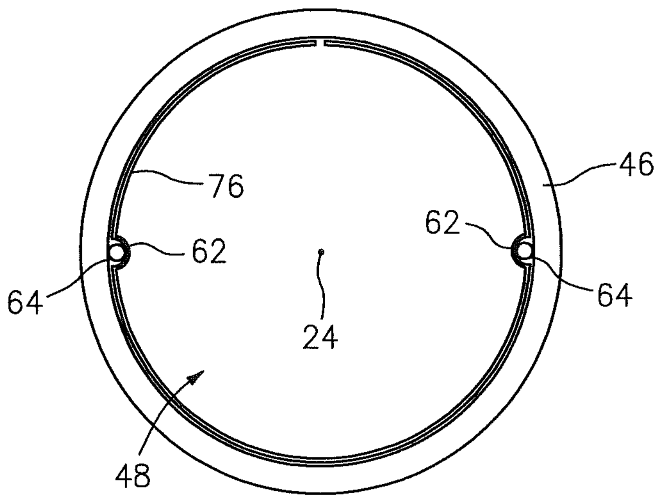
FIG. 6 is a cross-sectional illustration of a plurality of sensor conduit assemblies and a flexible conduit support arranged in a turbine engine shaft.

The conduit assemblies may be connected to the shaft wall utilizing a variety of different bonding and/or fastening techniques. In some embodiments, for example as illustrated in FIGS. 2 and 3, each conduit 64 may be welded, braised and/or adhesively bonded to the shaft wall 46 substantially continuously along its (e.g., entire) axial length. Examples of adhesives may include glue and epoxy. In other embodiments, for example as illustrated in FIGS. 4 and 5, each conduit 64 may be connected to the shaft wall 46 with one or more tack strips 74 at one or more respective discrete axial locations along the centerline 24. In still other embodiments, for example as illustrated in FIG. 6, the conduits 64 may be pressed (e.g., biased) against the shaft wall 46 with at least one flexible annular support 76. The present invention, however, is not intended to be limited to the aforesaid bonding and fastening techniques.

Figure 7:
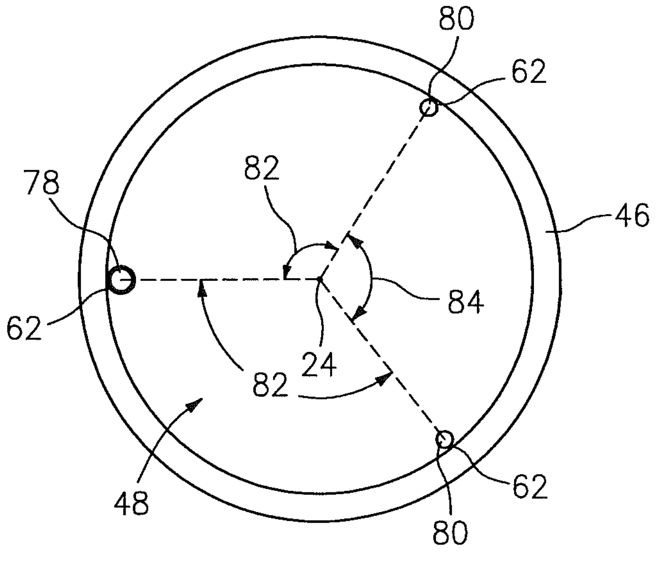
FIG. 7 is a cross-sectional illustration of a plurality of sensor conduit assemblies arranged in a turbine engine shaft.

In some embodiments, for example as illustrated in FIGS. 2 and 3, the conduits 64 may have substantially equal axial lengths, diameters and/or masses. In other embodiments, for example as illustrated in FIG. 7, a first conduit 78 may have a first diameter and a first mass, and a plurality of second conduits 80 may each have a second diameter and a second mass. The first diameter may be different (e.g., greater) than the second diameter, and the first mass may be different (e.g., greater) than the second mass. The first conduit 78 may be circumferentially spaced from the adjacent second conduits 80 by a first separation angle 82, and the adjacent second conduits 80 may be circumferentially spaced by a second separation angle 84. In such a configuration, the first separation angle 82 may be selected to be different (e.g., greater) than the second separation angle 84 to rotationally balance the conduit assemblies 62 about the centerline 24. Alternatively, additional wires (e.g., dummy wires) may be placed in one or more of the second conduits to balance the masses of the conduit assemblies.

The conduits have been illustrated in the drawings as having substantially circular cross-sectional geometries. A person of skill in the art will recognize, however, that the conduits may alternatively be configured with other geometries such as, for example, rectangular or oval cross-sectional geometries. The present invention therefore is not intended to be limited to any particular conduit cross-sectional geometry.

In alternate embodiments, the one or more sensors may be arranged with the fan and/or compressor rotors, and the transmitter and the receiver may be arranged at the second shaft end.

While various embodiments of the present invention have been disclosed, it will be apparent to those of ordinary skill in the art that many more embodiments and implementations are possible within the scope of the invention. Accordingly, the present invention is not to be restricted except in light of the attached claims and their equivalents.

What is claimed is:

1. A turbine engine system, comprising:

a turbine engine shaft comprising a shaft bore formed by a shaft wall, the shaft bore extending along an axial centerline through the turbine engine shaft between a first shaft end and a second shaft end;

a first rotor connected to the turbine engine shaft at the first shaft end;

a second rotor connected to the turbine engine shaft at the second shaft end; and an engine monitoring system comprising a sensor connected to the second rotor, a transmitter arranged at the first shaft end, and a plurality of conduit assemblies, wherein each of the plurality of conduit assemblies comprises a conduit extending axially within the shaft bore and connected to the shaft wall, and a first of the plurality of conduit assemblies further comprises a wire extending through the respective conduit and connecting the sensor and the transmitter.

2. The system of claim 1, wherein masses of the plurality of conduit assemblies are substantially rotationally balanced about the axial centerline.

3. The system of claim 1, wherein the plurality of conduit assemblies are substantially uniformly located circumferentially about the axial centerline.

4. The system of claim 1, wherein the shaft wall comprises a shaft wall geometry that radially undulates along the axial centerline, and the conduit in at least one of the plurality of conduit assemblies is shaped to substantially conform the shaft wall geometry.

5. The system of claim 1, wherein a diameter of the conduit in the first of the plurality of conduit assemblies is substantially equal to a diameter of the conduit in a second of the plurality of conduit assemblies.

6. The system of claim 1, wherein a mass of the first of the plurality of conduit assemblies is substantially equal to a mass of a second of the plurality of conduit assemblies.

7. The system of claim 6, wherein the second of the plurality of conduit assemblies further comprises a wire extending through the respective conduit.

8. The system of claim 1, wherein the conduit in at least one of the plurality of conduit assemblies is connected to the shaft wall at a plurality of discrete axial locations.

9. The system of claim 1, wherein the conduit in at least one of the plurality of conduit assemblies is connected to the shaft wall continuously along an axial conduit length of the respective conduit.

10. The system of claim 1, wherein the conduit in at least one of the plurality of conduit assemblies is connected to the shaft wall with an adhesive.

11. The system of claim 1, wherein the conduit in at least one of the plurality of conduit assemblies is connected to the shaft wall with one or more tack strips.

12. The system of claim 1, wherein the conduit in at least one of the plurality of conduit assemblies is at least one of welded and braised to the shaft wall.

13. The system of claim 1, wherein the conduit in each of the plurality of conduit assemblies is radially pressed against the shaft wall by a flexible annular support.

14. The system of claim 1, wherein the sensor communicates sensor data to the transmitter through the wire, and the transmitter wirelessly communicates the sensor data to a processing device through a receiver.

15. The system of claim 1, further comprising a turbine engine that comprises a compressor section, a combustion section, a turbine section and the turbine engine shaft, wherein the compressor section comprises the first rotor and the turbine section comprises the second rotor.

16. The system of claim 1, further comprising a turbine engine that comprises a fan section, a compressor section, a combustion section, a turbine section and the turbine engine shaft, wherein the fan section comprises the first rotor and the turbine section comprises the second rotor.

17. A turbine engine system, comprising:

a turbine engine shaft comprising a shaft bore formed by a shaft wall, the shaft bore extending along an axial centerline through the turbine engine shaft between a first shaft end and a second shaft end;

a first rotor connected to the turbine engine shaft at the first shaft end;

a second rotor connected to the turbine engine shaft at the second shaft end; and an engine monitoring system comprising a sensor connected to the second rotor;

a transmitter arranged at the first shaft end;

a plurality of conduits circumferentially arranged about the axial centerline, wherein each of the plurality of conduits extends axially within the shaft bore and is connected to the shaft wall; and a wire extending through a first of the plurality of conduits and connecting the sensor and the transmitter.

18. The turbine engine system of claim 17, wherein the first of the plurality of conduits engages the shaft wall.

* * * * *